Figure 1:
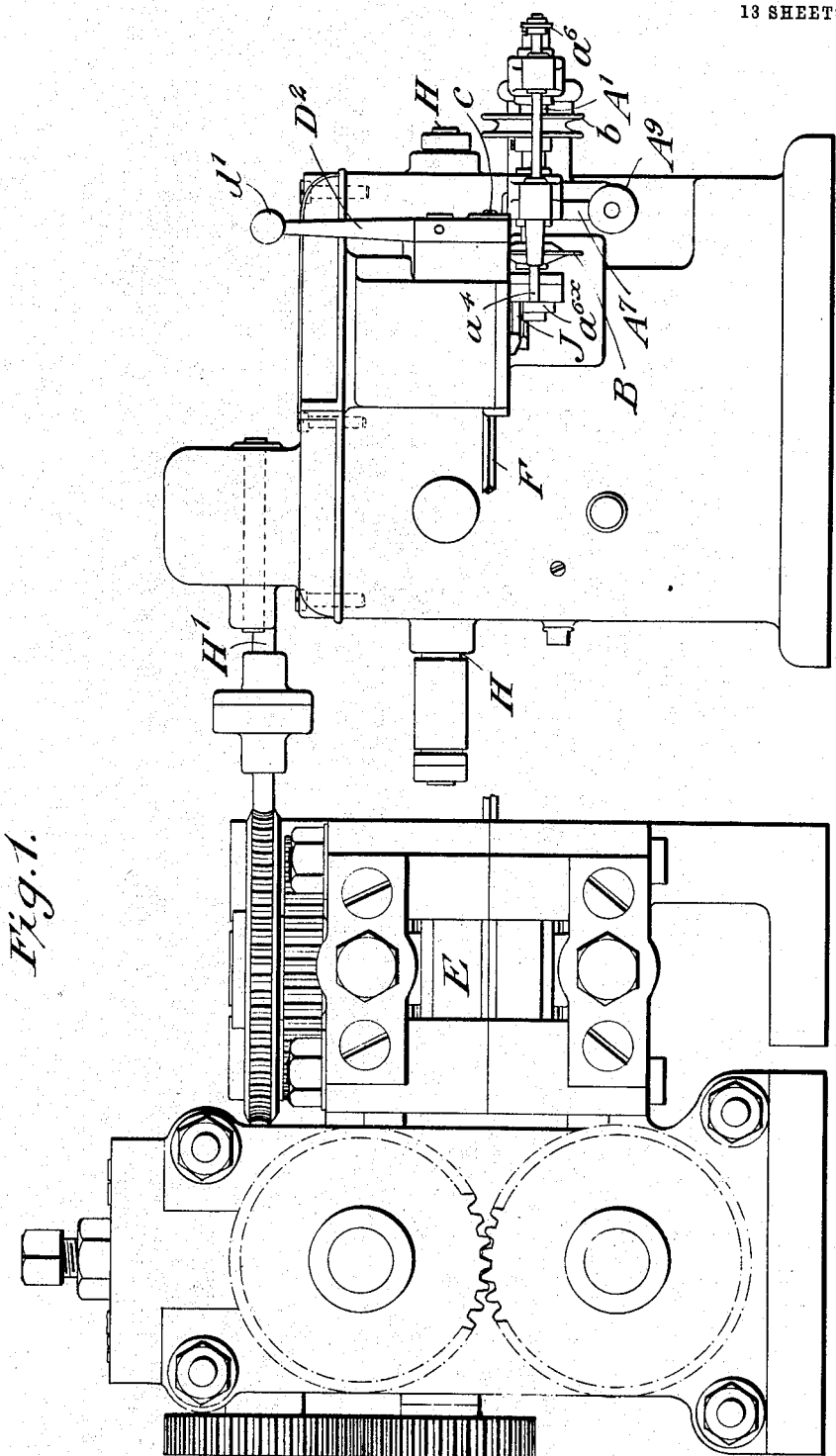

F. H. PIERPONT.
MACHINE FOR SEVERING UNIFORM LENGTHS FROM A ROD OR BAR.
APPLICATION FILED MAR. 4, 1912.

1,061,564.

Patented May 13, 1913.

13 SHEETS—SHEET 1.

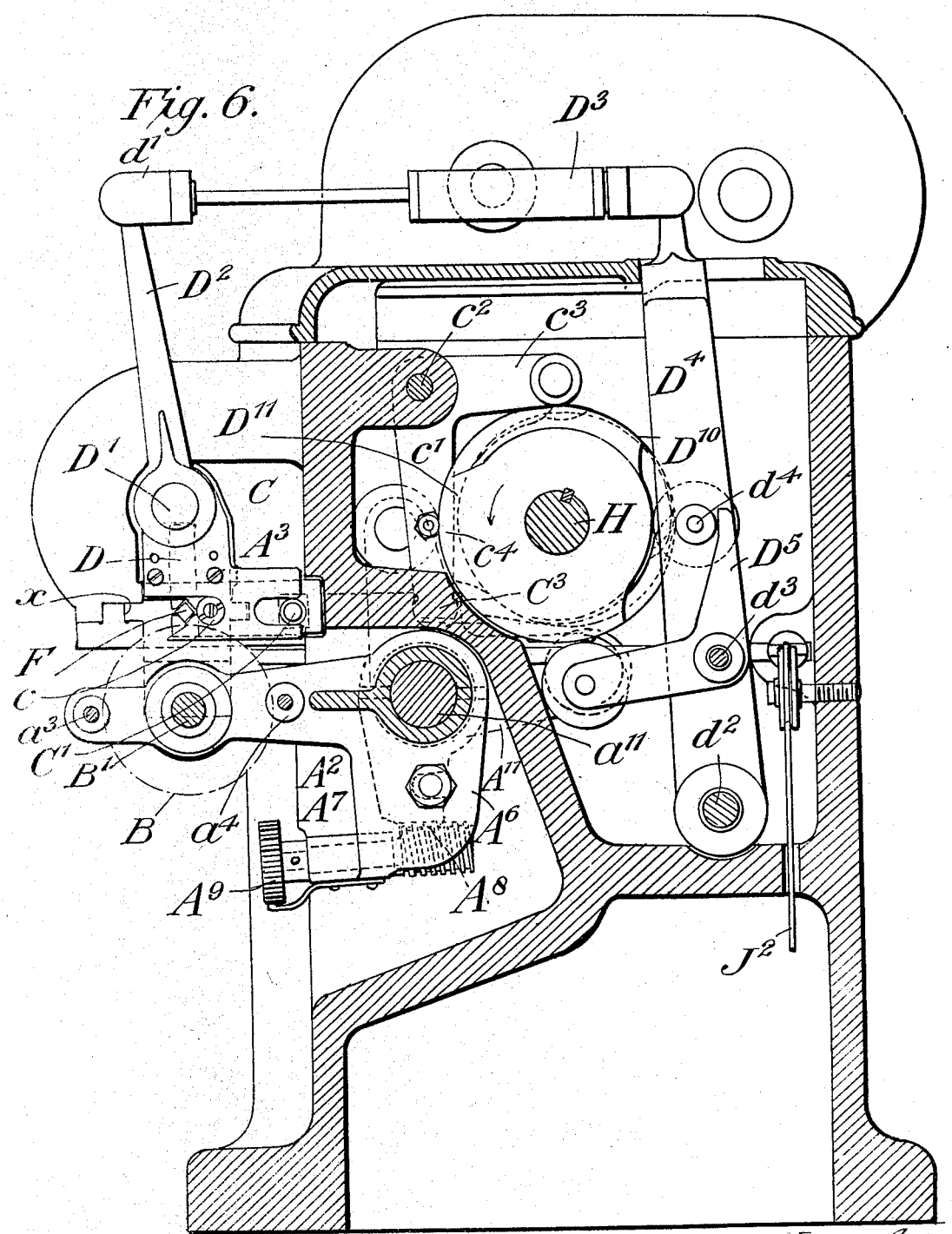

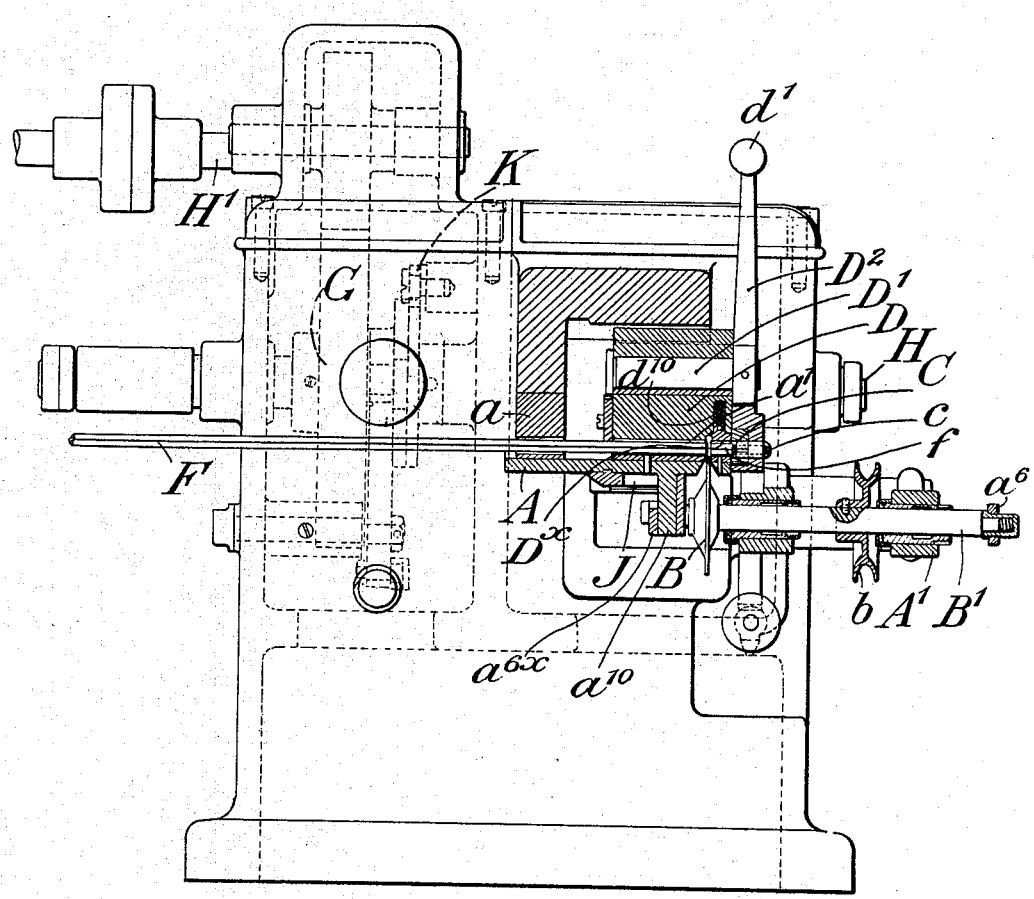

F. H. PIERPONT.
MACHINE FOR SEVERING UNIFORM LENGTHS FROM A ROD OR BAR.
APPLICATION FILED MAR. 4, 1912.

1,061,564.

Patented May 13, 1913.
13 SHEETS—SHEET 8.

Witnesses

Inventor
F. H. Pierpont
by Church & Church
his Attorneys

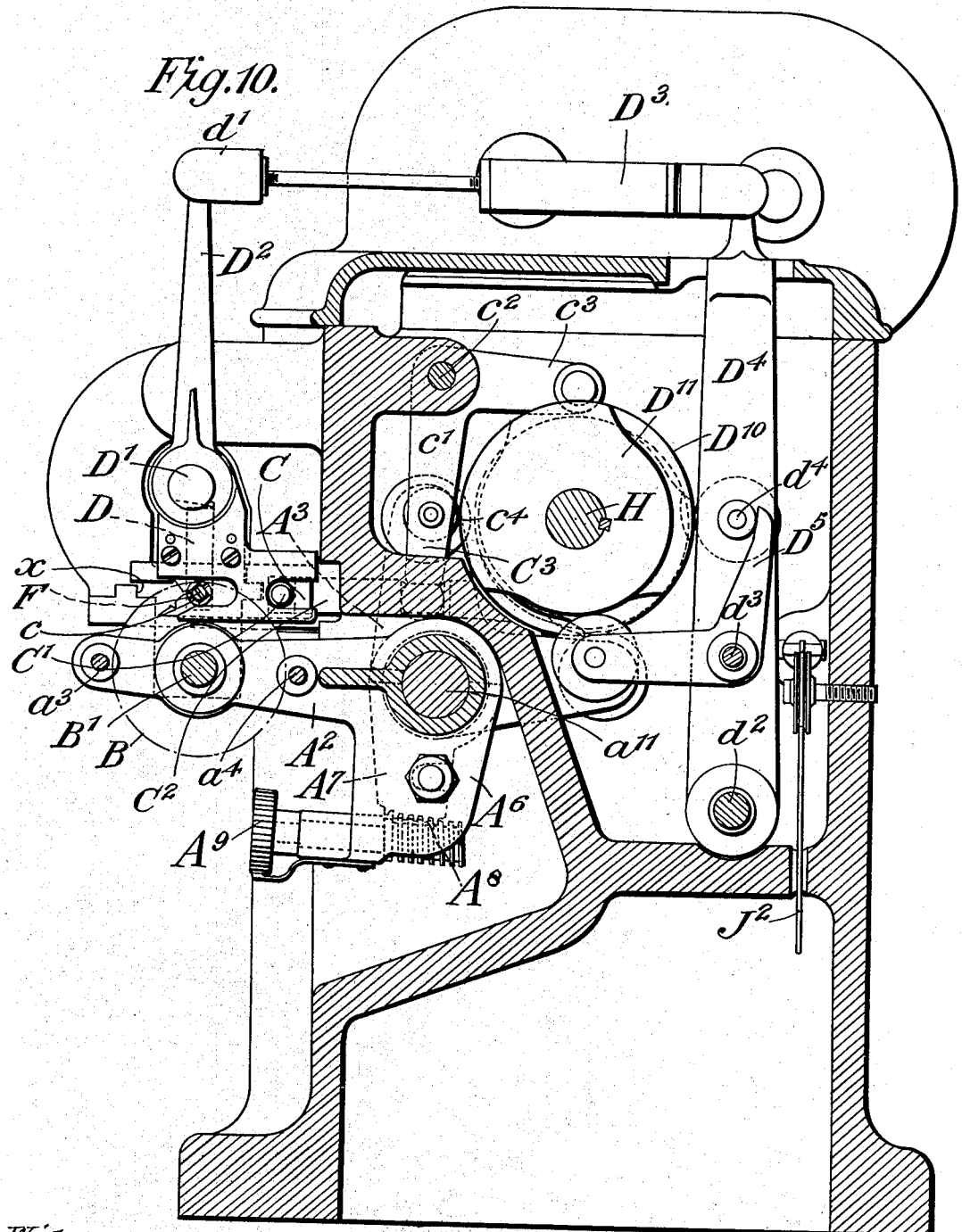

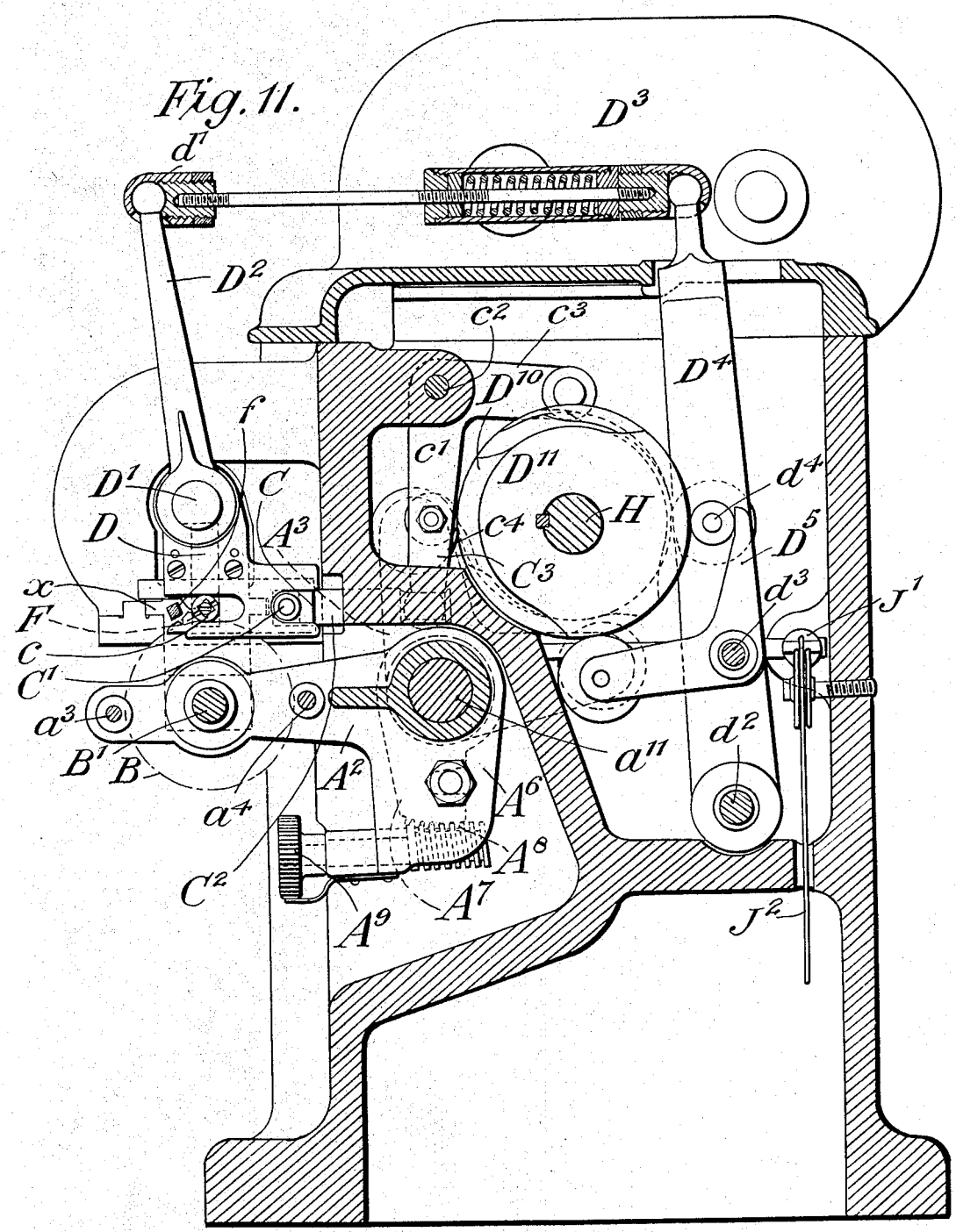

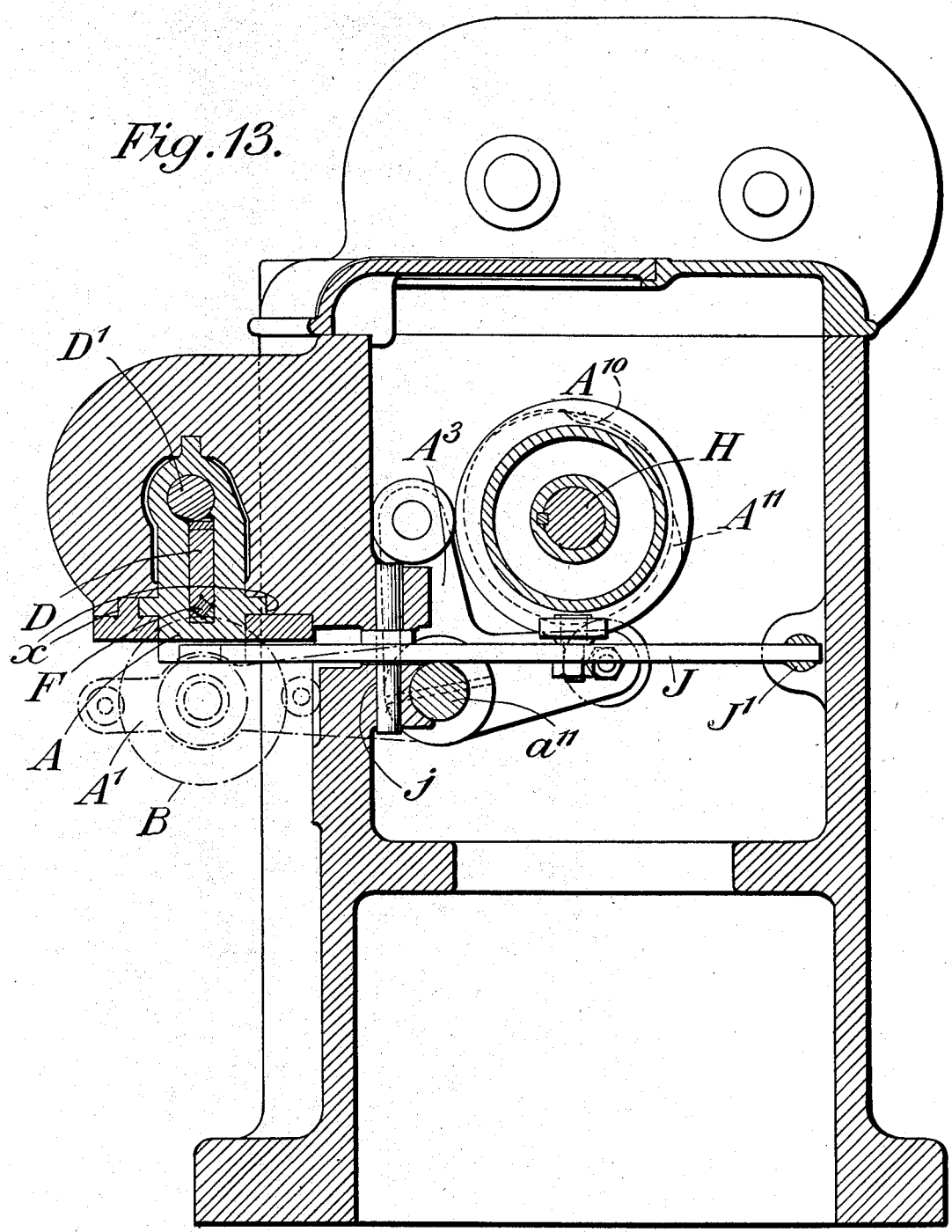

F. H. PIERPONT.
MACHINE FOR SEVERING UNIFORM LENGTHS FROM A ROD OR BAR.
APPLICATION FILED MAR. 4, 1912.
1,061,564.  Patented May 13, 1913.
13 SHEETS—SHEET 13.
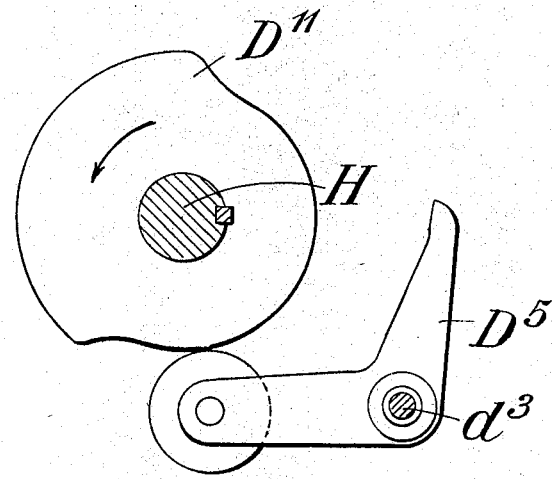
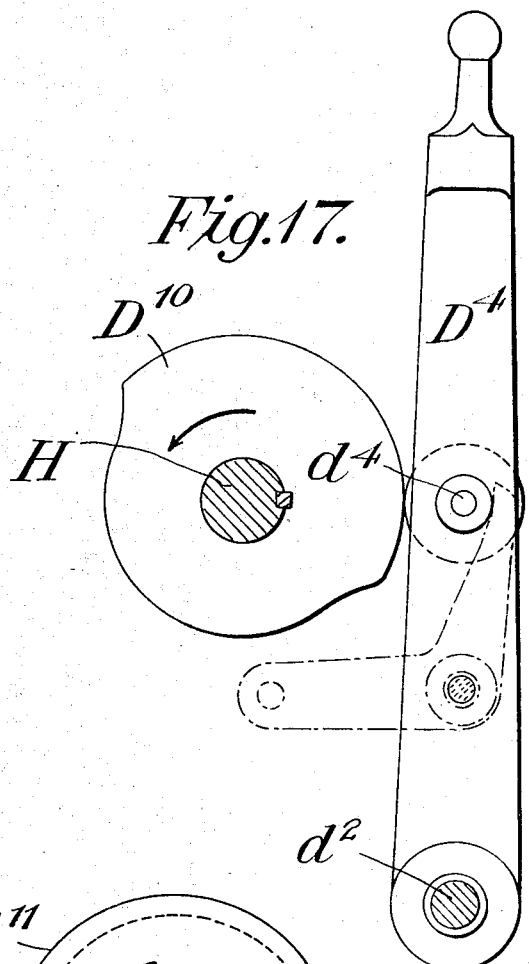
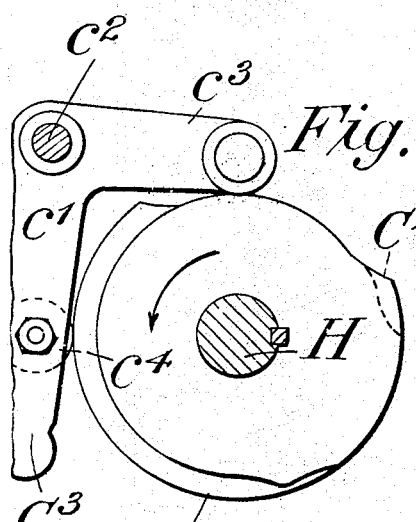
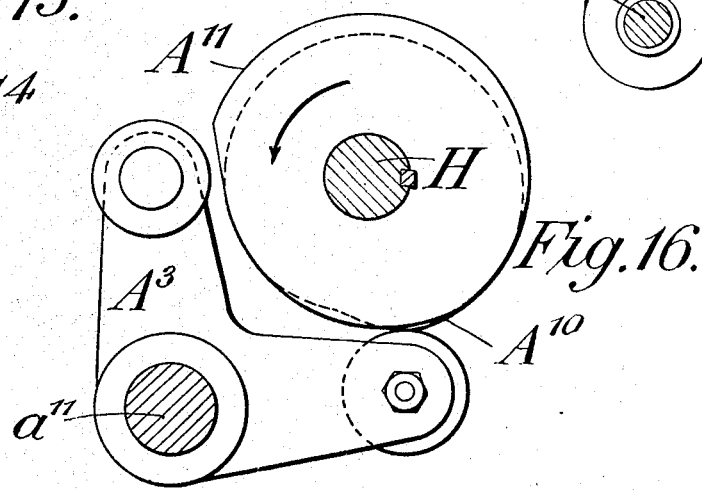
Witnesses
Inventor
F. H. Pierpont
by Church & Church
his Attorneys

UNITED STATES PATENT OFFICE.

FRANK HINMAN PIERPONT, OF HORLEY, COUNTY OF SURREY, ENGLAND, ASSIGNOR TO LANSTON MONOTYPE MACHINE COMPANY, OF PHILADELPHIA, PENNSYLVANIA, A CORPORATION OF VIRGINIA.

MACHINE FOR SEVERING UNIFORM LENGTHS FROM A ROD OR BAR.

1,061,564.     Specification of Letters Patent.     Patented May 13, 1913.

Application filed March 4, 1912. Serial No. 681,427.

*To all whom it may concern:*

Be it known that I, FRANK HINMAN PIERPONT, a citizen of the United States, residing at Salford, Horley, in the county of Surrey, England, have invented a certain new and useful Improvement in Machines for Severing Uniform Lengths from a Rod or Bar; and I do hereby declare the following to be a full, clear, and exact description of the same, reference being had to the accompanying drawings, forming a part of this specification, and to the figures and letters of reference marked thereon.

This invention relates to machines or apparatus for cutting or severing uniform or equal lengths from a rod, strip or bar, and has for its chief object to provide a machine for automatically cutting or severing such lengths from a rod, strip or bar in motion, the feed movement of the rod or the like controlling the proper movement or operation of the cutting or severing device and the operation of the machine or the timing of some or all of the operative parts of the machine.

According to this invention, the rod, strip or bar is continuously fed forward by appropriate rolls or feeders and cut into uniform lengths or has uniform lengths cut from it by a rotary cutter the forward movement of which in company with the rod and also the movement to effect the cut are controlled by the rod itself as are likewise the operations of other members of the machine which coöperate with the cutter whereby the uniformity of the lengths cut and the proper timing of the various elements are effected.

The cutter is rotated by a separate drive and is mounted in a carriage that is moved in one direction along supporting guides by the forward end of the rod and in consequence of this forward movement of the rod the cutter is moved across the path of the rod to sever a piece therefrom by a cam or its equivalent controlled by the forward movement of the rod. At the end of the cut, a stop, against which the end of the rod bears to move the carriage is withdrawn through mechanism controlled also by the rod, and after the carriage returns to initial position the stop is again projected to discharge the severed part of the rod, and to act as a gaging stop for the next length to be cut.

The rod which, in moving forward, directly controls the travel of the cutter in company with it controls through a clutch or clutch mechanism the operation of a clamping device, the movable stop, the movement of the cutter across the rod to effect the cutting operation and the return of the carriage to initial position after the cut.

Figure 2:
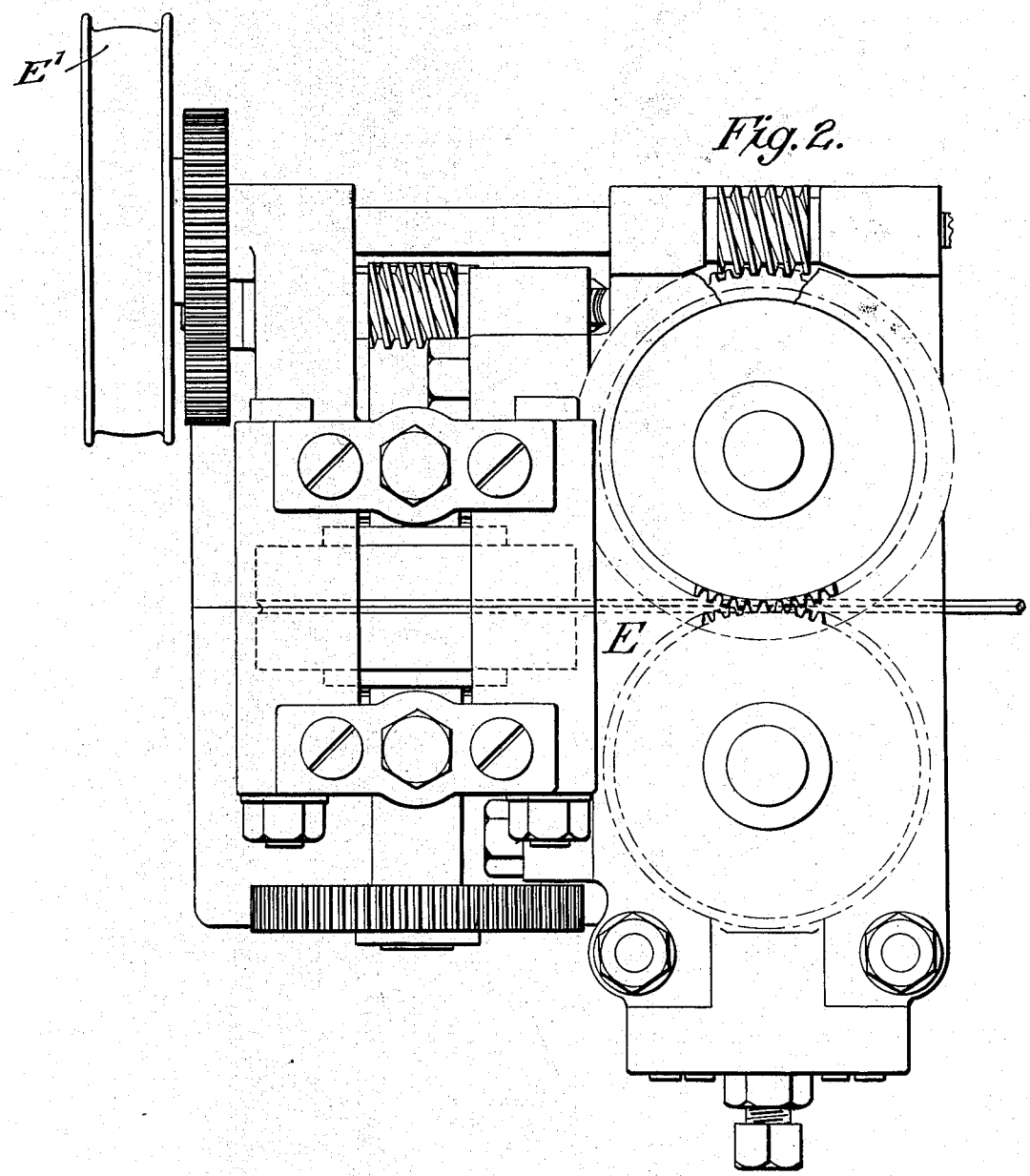
Figure 3:
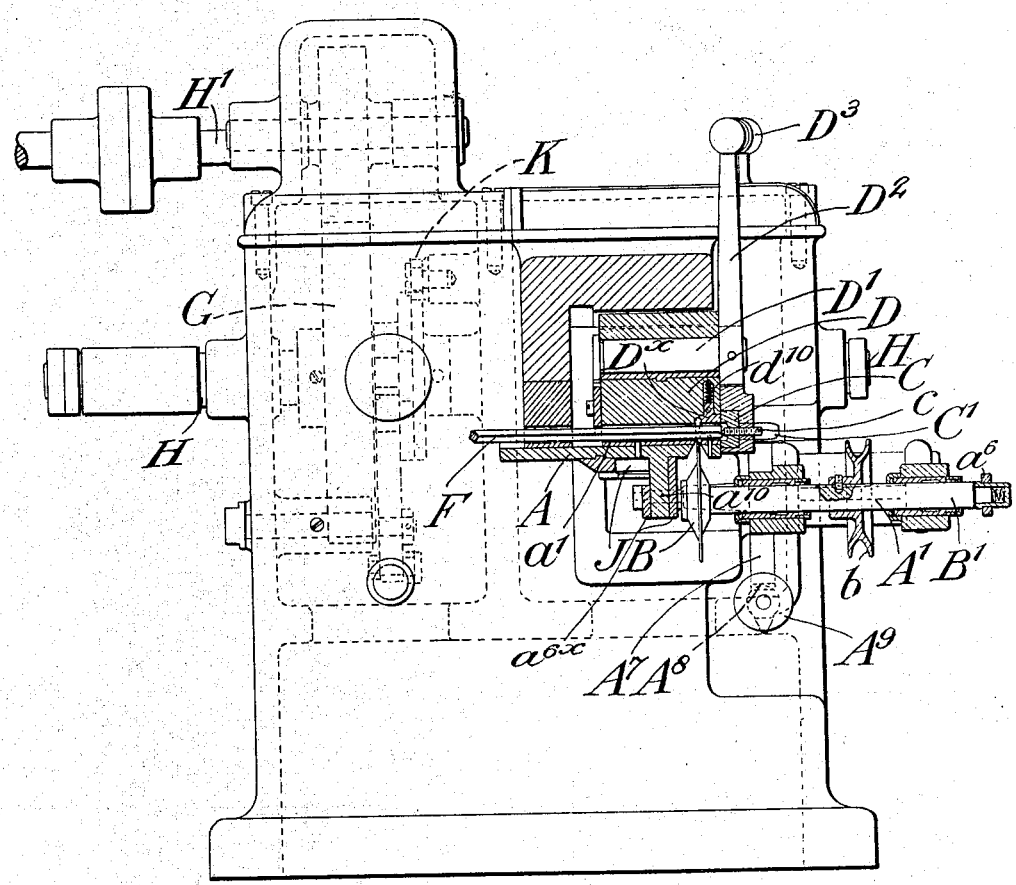
Figure 4:
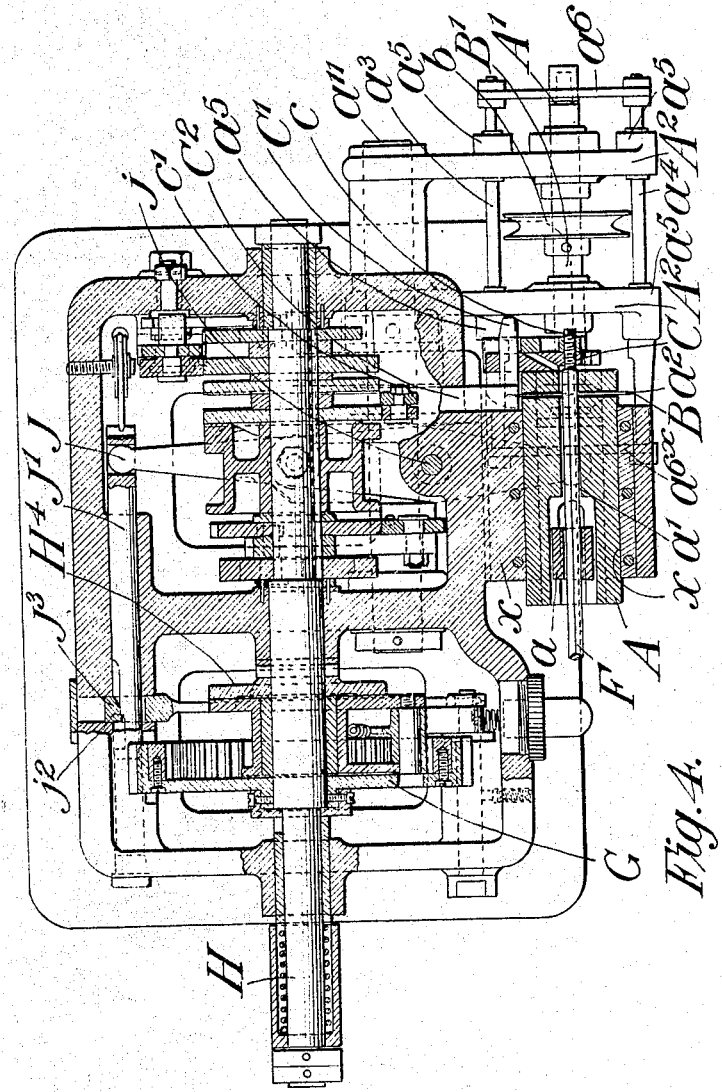
Figure 5:
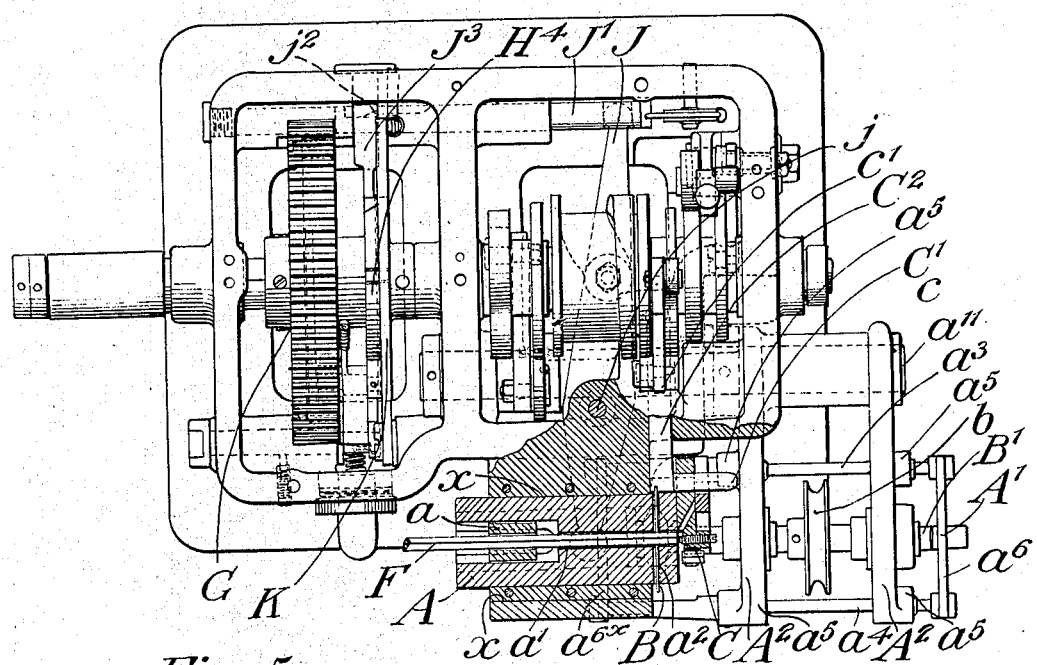
Figure 9:
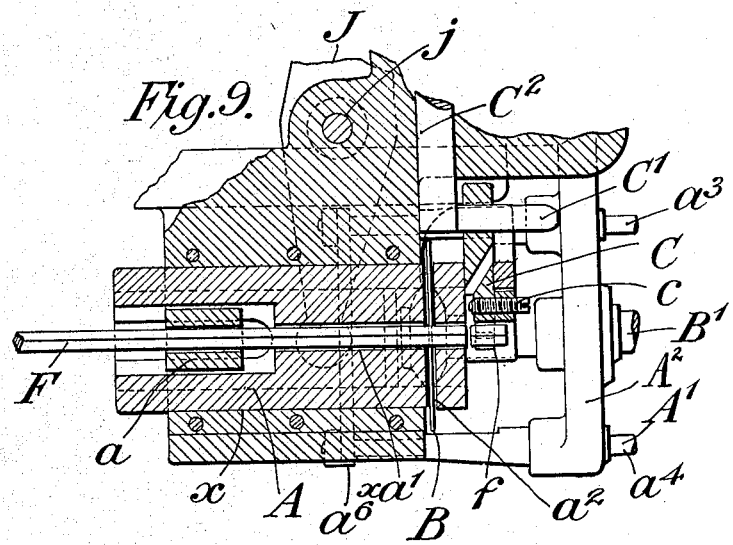
Figure 8:
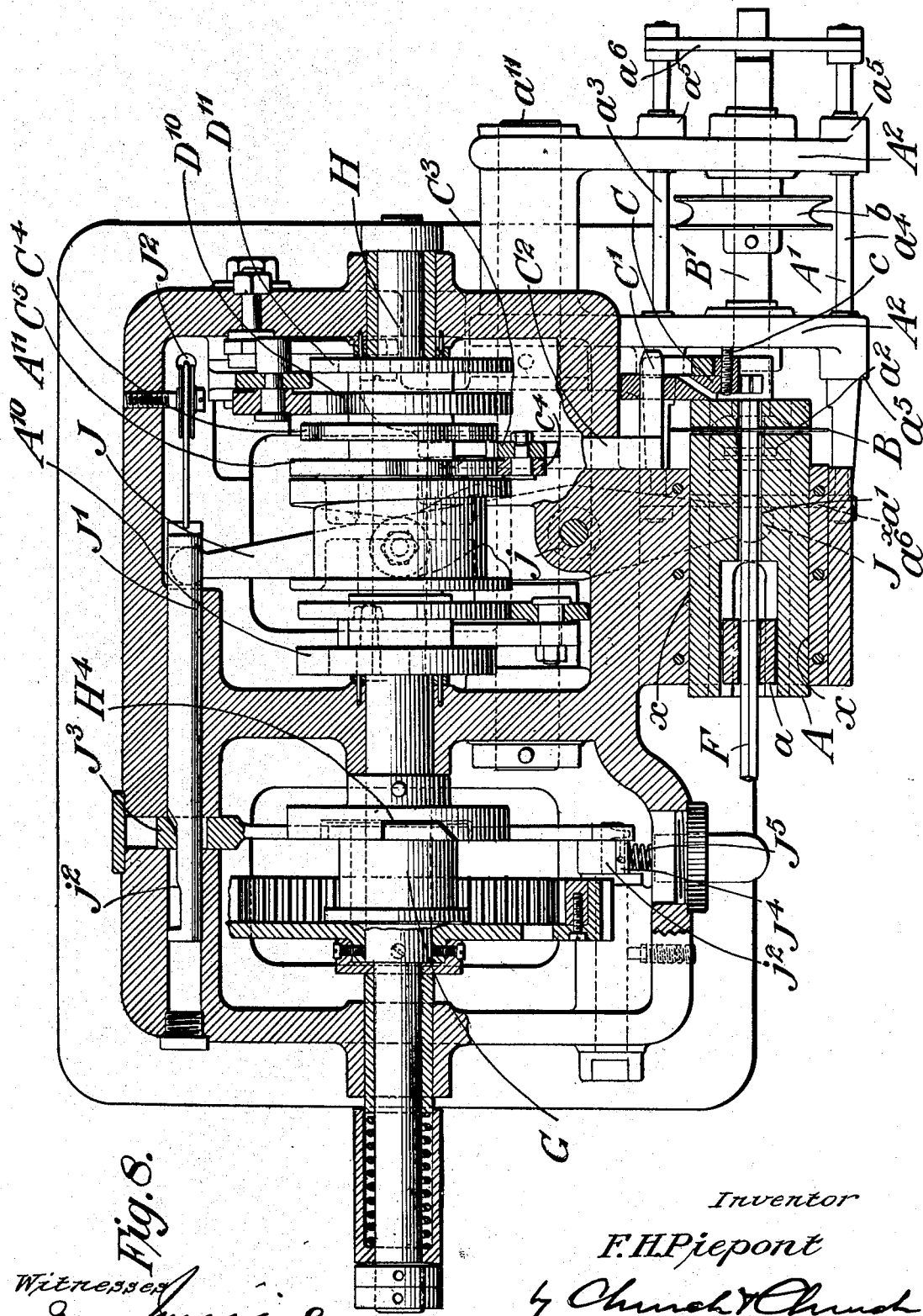
Figure 12:
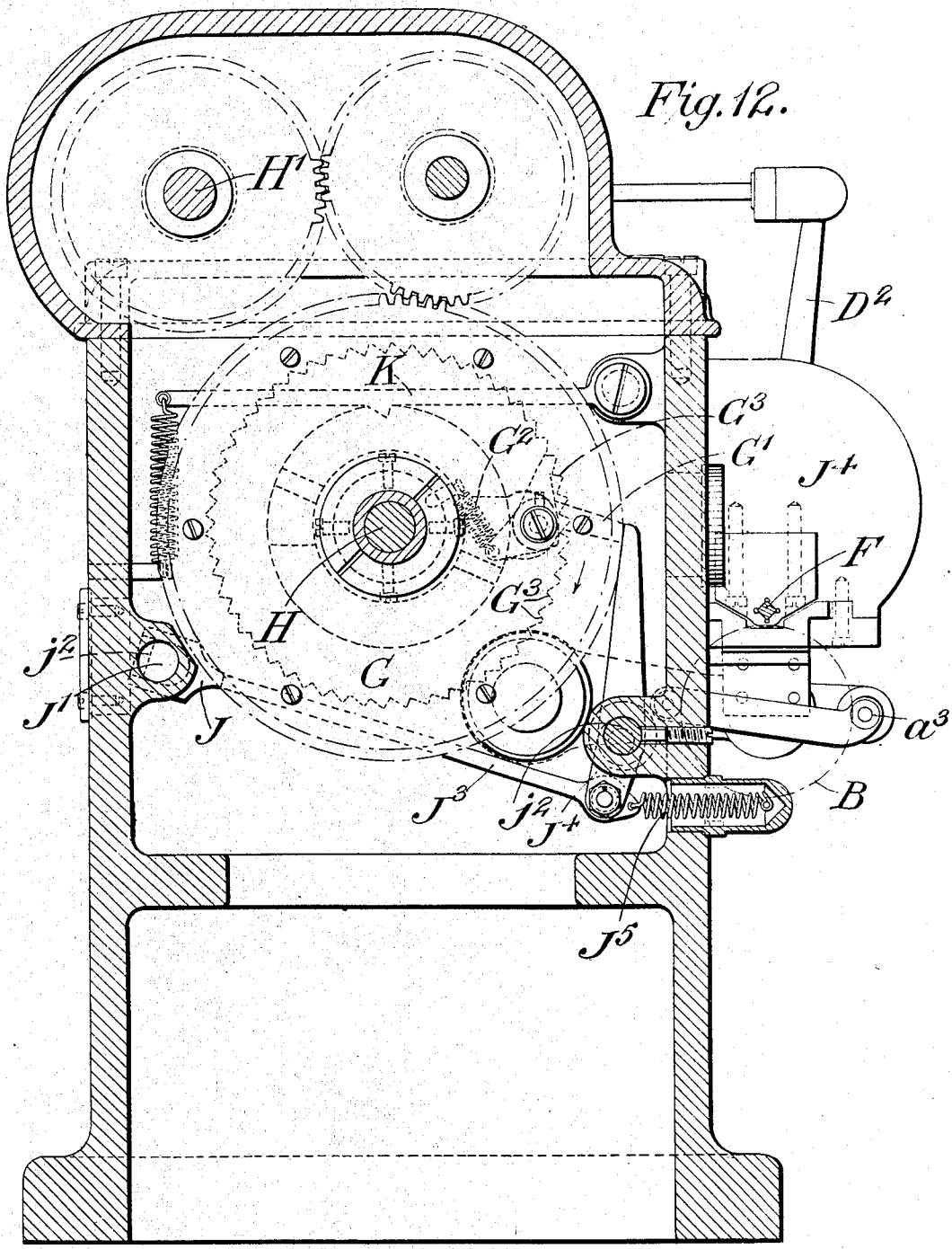

In the accompanying drawings: Figure 1 is a front elevation of the machine. Fig. 2 is a top plan view of the feeding mechanism. Fig. 3 is a front elevation partly in section of the severing mechanism the parts being shown in the position they assume at the beginning of the cycle. Fig. 4 is a horizontal section of the severing mechanism taken in the plane of the cam shaft. Fig. 5 is a top plan view partly in section of the severing mechanism showing the parts in position just after the commencement of the cycle. Fig. 6 is a sectional end elevation taken on line a—a, Fig. 5. Fig. 7 is a longitudinal vertical section of the severing mechanism showing the parts in position after the withdrawal of the cutter. Fig. 8 is a horizontal section of the severing mechanism in the plane of the cam shaft showing a further step in the cycle. Fig. 9 is a sectional plan of part of the severing mechanism showing the parts at the completion of the cycle. Fig. 10 is a sectional end elevation corresponding with Fig. 6, but with the cutter in its advanced position after severing the blank. Fig. 11 is a similar view showing the parts in position discharging the severed blank. Fig. 12 is a left end elevation of the severing mechanism, a portion of the framing being removed and in section. Fig. 13 is a vertical section through the rod clamping devices. Fig. 14 is a side elevation of the cam and lever for effecting the release of the clamping devices. Fig. 15 is a side elevation of the cams and lever for reciprocating the end gage and ejector. Fig. 16 is a side elevation of the cams and lever for reciprocating the cutter. Fig. 17 is a side elevation of the cam and lever for closing the clamping devices.

Like letters of reference in the several figures indicate the same parts.

A is the carriage, B the cutter, C the stop, D the clamping device, E are the feed rolls, F is the rod or bar, and G is the clutch.

The carriage A comprises a block mounted to slide in guides or bearings $x$ on the machine frame and provided with a guide $a'$ for the rod F. A second guide $a$ for the rod is formed on the machine frame and projects through a slot in the block A.

A slot $a^2$ is formed in the carriage A for the passage of the saw or cutter B, and the stop or gage C for determining the length to be cut from the rod F is mounted in the forward end of the carriage A. The stop C which is mounted to slide in a guide in the carriage, is provided with an adjustable screw $c$ (see Figs. 5 and 7) against which the front end of the rod F bears to move the cutter B forward in company with it and to govern mechanism controlling the operation of the clamp, the movement of the cutter and the return of the carriage after the cut.

The stop C is moved to and fro to act as gage stop and ejector by the forward movement of the rod F and is conveniently operated in both directions by cams controlled by the rod F (see Figs. 4, 9 and 10). Preferably the stop C is bored at its rear end for the passage of a pin $C'$ of sufficient length to allow the stop C to move along it in company with the carriage A without becoming disengaged.

The pin $C'$ (see Figs. 4, 8, 9 and 10) is carried on a sliding rod $C^2$, the rear end of which is connected to one arm $c'$ of a bell crank lever $C^3$ which is pivoted at $c^2$ and has its other arm $c^3$ bearing on a cam $C^4$ (see Fig. 14) on a shaft H. The cam $C^4$ withdraws the stop C from engagement with the forward end of the rod (see Fig. 8) and a companion cam $C^5$ (see Fig. 15) on the same shaft, by engaging a roller $c^4$ on the arm $c'$, returns the stop to eject the cut-off portion of the rod (see Fig. 11) and to form the gage stop for the next piece to be cut (see Figs. 4 and 15).

The operation of the cams $C^4$ and $C^5$ by which the projection and withdrawal of the stop and ejector C are effected is controlled from the rod F conveniently by means of a pivoted lever J (see Figs. 4 and 12) connected in the present instance, at one end to the carriage A, and operatively connected through its other end with the controlling mechanism of a one-revolution clutch G (see Figs. 4, 5, 8 and 12) by which motion is transmitted from a motor or driving shaft $H'$ to the cam shaft H.

The cutter B is conveniently in the form of a circular saw. It is carried on a rotary spindle $B'$ carried in a supplementary carriage or frame $A'$ (see Figs. 1, 4, 5 and 8) movable to and fro in company with the carriage A but capable of being rocked or tilted to move the cutter across the rod F. Rotary motion is imparted to the cutter through a pulley $b$ driven from a suitable source of power.

The supplementary carrier $A'$ is composed of two rods $a^3 a^4$ disposed parallel with the spindle $B'$ and connected at one end by a cross bar $a^6$ in which one end of the spindle $B'$ can rotate and connected similarly to the other end by a bar $a^{6x}$. The bar $a^{6x}$ is passed behind a projection $a^{10}$ on the carriage A to couple the two carriages together in such a manner that while they must always travel to and fro together, the carriage $A'$ can move vertically relatively to the carriage A (see Figs. 1 and 6) to advance and retract the cutter. The two rods $a^3 a^4$ are mounted in bearings $a^5$ in arms $A^2$ hinged or pivoted on a shaft $a^{11}$.

As the rod F moves forward from the position shown in Figs. 1, 4 and 5, carrying with it the cutter, the lever J is turned on its pivot effecting the operation of the cutter lifting mechanism. Conveniently the movement of the lever J effects the closing of the clutch G thereby rotating the cam shaft H and causing a cam $A^{10}$ (see Figs. 8 and 16) thereon to tilt or lift the cutter carrying frame $A'$ to bring the cutter against the rod F to cut it (see Fig. 10).

The cam $A^{10}$ acts on one end of a bell crank lever $A^3$, Figs. 13 and 16, supported on the shaft $a^{11}$ the other end of which engages an arm $A^6$ connected to the boss of the arm $A^2$. In order to permit adjustment to accommodate change in the size of the cutter B or cam $A^{10}$ an arm $A^7$ of the lever $A^3$ has teeth $A^8$ adapted to mesh with an adjustable screw stop $A^9$ on the arm $A^6$. The cam $A^{10}$ acts on one arm of the lever $A^3$, to raise the cutter and effect the cut, and a companion cam $A^{11}$ on the same shaft acts to lower the cutter after the cut is completed.

When the front end of the rod F has been forced against the stop C, a clamping device controlled by the forward movement of the rod is operated to clamp the rod in the carriage during the cutting operation. This clamping mechanism comprises a block D which is mounted in the carriage A above the guide $a'$ and has its lower end or face shaped or cut to correspond to the part of the rod which it embraces, the upper face of the guide $a'$ in the carriage being similarly cut or formed so that the rod is held securely between them. Normally the block rests lightly upon the rod or it may be held away from contact with the rod by springs and is forced down to clamp the rod by an eccentric $D'$ controlled by the forward movement of the rod (see Figs. 1, 5 and 6). In the forward end of the block D is inserted a block $D^x$ adapted, under action of a spring $d^{10}$ to bear upon the severed part or part to be severed and prevent its displacement. The eccentric $D'$ (see Figs. 1, 4 and 9) is connected to a lever $D^2$ the other end of which is connected by a ball joint $d'$ to a compressible link $D^3$. The link $D^3$ is coupled by a ball joint with a lever $D^4$ the other end of which is pivoted to the machine at $d^2$ (see Figs. 6, 10 and 11). The lever $D^4$ carries a roller which engages a cam $D^{10}$ (see Fig. 17) on the shaft H by which the parts are moved to cause the block to clamp the rod F.

The clamping device is released by a cam $D^{11}$ (see Figs. 11 and 14) on the shaft H which operates on one arm of a bell crank lever $D^5$ pivoted at $d^3$ and engaging with its other end a pin $d^4$ on the lever $D^4$.

The clutch G is operated or controlled by the movement of the rod F acting through the carriage A on the lever J, which is pivoted to the frame at $j$.

The end of the lever J engages a longitudinally sliding rod J' which is under the control of a weight (not shown) pendent from cord $J^2$ constantly tending to move the rod to one extreme of its travel. As the rod F at the beginning of the cycle moves the carriage A forward the lever J moves the rod J' to the left against the action of the weight and causes an inclined surface $j^2$ on the rod J' to act on a corresponding inclined surface on a bar $J^3$ (see Figs. 4, 5 and 8) and move this bar longitudinally. The opposite end of the bar $J^3$ is connected to a lever $J^4$ (see Fig. 12) pivoted at $j^2$ and normally projecting, under the influence of a spring $J^5$, into the path of a pawl G' carried by one member of the one-revolution clutch G. The movement of the bar $J^3$ by the rod J' withdraws the lever from the path of the pawl G' allowing the latter under the action of a spring $G^2$ to engage one of a series of teeth $G^3$ carried by the other clutch member thus closing the clutch to transmit motion to the cam shaft H.

When the carriage has reached the end of its travel and the cut is completed, the cutter B is withdrawn by its cam (see Fig. 7) the stop C is withdrawn (see Fig. 8) and thereafter the cam $A^{10}$ comes into operation to return the carriages A and A' together with the cutter B for severing the next section. This advances and leaves the severed part $f$ of the rod in front of the stop C (see Fig. 9). Next the cam projects the stop C discharging the cut off part $f$ (see Fig. 11) and placing the stop in position to meet the front end of the advancing rod.

The cam $A^{10}$ is cut so as not to interfere with the operation of the lever J under the influence of the rod F, but once the clutch is closed the cam will advance the carriage should anything interfere with the advance of the rod, so that the parts are maintained in proper relative position.

On the cam shaft H is an auxiliary clutch $H^4$ which automatically opens and allows the driving shaft to rotate if the cam shaft is held up by any obstruction.

A spring controlled brake stop K engages a notch in a disk on the cam shaft to insure the latter stopping at the proper position.

The feed rolls E which are placed one over the other are grooved as shown for the reception of the rod and may as in the present example serve to consolidate or compress the rod in addition to feeding it forward. The feed rolls are rotated by gearing in the manner usual in rolling mills. The drive for the rolls E is transmitted through a pulley E' and in the event of the cutting mechanism or other part of the machine being prevented from operating, clutch mechanism (not shown) is provided similar to the auxiliary clutch aforesaid so that the feed of the rod may also be stopped.

What I claim as new is:

1. In a machine or apparatus for cutting or severing uniform or equal lengths from a moving rod, bar or the like, the combination with a rod feeding mechanism and a rotary cutter mounted in a carriage that is moved by the advancing rod, of a clamping mechanism mounted in the carriage and controlled by the movement of the rod, substantially as described.

2. In a machine or apparatus for cutting or severing uniform or equal lengths from a continuously moving rod, bar or the like furnished with rod feeding rolls, and a rotary cutter mounted in a carriage that is moved by the advancing rod, the combination with a rod clamping device, and a combined stop and ejector, of a shaft having cams controlling certain movements of the carriage, the stop ejector and the clamping device and a one-revolution clutch controlled by the movement of the rod to couple the cam shaft with a driving shaft, substantially as described.

3. In a machine for severing uniform lengths from a rod or bar, the combination of the following elements, to-wit: means for continuously feeding or advancing the rod; a carriage supported to reciprocate longitudinally of the rod and provided with a gage movable transversely of the rod into and out of the path of the latter; a rotary cutter mounted upon the carriage and movable transversely thereof in a path intersecting the rod; rod clamping means mounted on the carriage; and actuating devices for said cutter, carriage, gage and clamping means, the same including driving and driven members and a one revolution clutch under the control of the movable carriage.

4. In a machine such as described, the combination of the following elements, to-wit: rod feeding means; a carriage movable longitudinally of the rod and equipped with a gage projecting into the line of travel of the rod, a clamping means, and a rotary cutter, the latter movable in a path intersecting the rod at a point intermediate said clamping means and gage; and actuating mechanism for said cutter and clamping means controlled by the feeding mechanism through the engagement of the rod with the gage on the carriage.

5. In a machine of the class described provided with means for continuously advancing or feeding a rod, and means for severing the rod into predetermined lengths including a carriage movable longitudinally of the rod equipped with a gage movable into and out of the path of the rod, a clamp for engaging the rod and a reciprocating cutter intermediate the gage and clamp, and in combination therewith, an actuating mechanism for said gage, clamp and cutter, the same including driving and driven members, a one revolution clutch, and controlling devices for said clutch coupled with the carriage to close the clutch.

6. In a machine of the class described, the combination of the following elements, to-wit: means for continuously advancing or feeding a rod; a carriage mounted to reciprocate longitudinally of the rod and provided with a reciprocatory gage, a clamp for the rod and a reciprocatory cutter intermediate said clamp and gage; and actuating devices for said clamp, gage and cutter, the same including a cam shaft, a driver therefor, a one revolution clutch, and control devices for said clutch coupled with the carriage whereby the movement transmitted to the carriage through the engagement of the rod with the gage thereon closes the clutch, closes the clamp on the rod, advances the cutter to sever the rod, retracts the gage, returns the carriage, and advances the gage to operating position followed by the automatic opening of the clutch.

7. In a machine of the class described, the combination with means for continuously advancing or feeding the rod and a rotary cutter mounted to reciprocate both longitudinally and laterally of the rod, of a carriage coupled with the cutter to reciprocate in unison therewith longitudinally of the rod, a clamp mounted on the carriage on one side of the line of movement of the cutter toward the rod, a gage mounted on the carriage on the other side of said line of movement of the cutter and movable into and out of the path of the rod, and means controlled through the engagement of the rod with said gage for automatically retracting the gage and closing the clamp, whereby the advancing movement of the rod is transmitted to the cutter first through the gage and subsequently through the clamp.

FRANK HINMAN PIERPONT.

Witnesses:
H. D. JAMESON,
O. J. WORTH.